(12) United States Patent
Eftekharzadeh

(10) Patent No.: US 11,858,379 B2
(45) Date of Patent: Jan. 2, 2024

(54) MOTION PLUG

(71) Applicant: Shahriar Eftekharzadeh, Torrance, CA (US)

(72) Inventor: Shahriar Eftekharzadeh, Torrance, CA (US)

(*) Notice: Subject to any disclaimer, the term of this patent is extended or adjusted under 35 U.S.C. 154(b) by 489 days.

(21) Appl. No.: 17/321,447

(22) Filed: May 16, 2021

(65) Prior Publication Data

US 2021/0268912 A1 Sep. 2, 2021

(51) Int. Cl.
*B60L 9/00* (2019.01)
*H01R 13/703* (2006.01)
*H01R 41/00* (2006.01)
*B60C 19/00* (2006.01)

(52) U.S. Cl.
CPC ............ *B60L 9/00* (2013.01); *H01R 13/7036* (2013.01); *H01R 41/00* (2013.01); *B60C 19/00* (2013.01); *H01R 2201/26* (2013.01)

(58) Field of Classification Search
CPC ....... B60C 19/00; B60C 19/08; B60C 19/082; B60C 19/084; B60C 19/086; B60C 19/088; B60C 2019/005; B60L 9/00; B60L 9/04; B60L 9/06; B60L 9/08; B60L 9/10; B60L 9/12; B60L 9/14; B60L 9/18; B60L 9/20; B60L 9/22; B60L 9/24; B60L 9/26; B60L 9/28; B60L 9/30; B60L 13/003; B60L 13/006; B60L 53/10; B60L 53/12; B60L 53/126; B60L 53/14; B60L 53/50; B60L 53/53; B60L 53/56; B60L 53/57; H01R 13/7036; H01R 41/00; H01R 2201/26

USPC ......... 191/1 A, 6, 13, 14, 15, 16, 17, 18, 19, 191/20, 21, 22, 22 C, 63
See application file for complete search history.

(56) References Cited

U.S. PATENT DOCUMENTS

| | | | | |
|---|---|---|---|---|
| 3,750,803 | A * | 8/1973 | Paxton | B60L 13/10 104/130.02 |
| 4,139,071 | A * | 2/1979 | Tackett | B60L 9/00 191/1 R |
| 5,503,259 | A * | 4/1996 | Clopton | B60L 5/42 191/6 |
| 5,821,728 | A * | 10/1998 | Schwind | H02J 50/40 320/108 |
| 6,189,664 | B1 * | 2/2001 | Siciliano | B60M 1/103 191/6 |
| 7,932,625 | B2 * | 4/2011 | Vienney | B60M 3/04 307/9.1 |
| 8,800,738 | B2 * | 8/2014 | Urano | H02J 50/12 307/104 |
| 9,634,732 | B2 * | 4/2017 | Flomenhoft | B60L 53/12 |
| 10,059,213 | B2 * | 8/2018 | Ricci | H02J 7/00034 |
| 10,787,086 | B2 * | 9/2020 | Javaid | B60L 53/38 |
| 11,034,252 | B2 * | 6/2021 | Barnes | B60L 53/60 |
| 2011/0133692 | A1 * | 6/2011 | Shimoyama | B60L 53/126 320/108 |
| 2020/0269711 | A1 * | 8/2020 | VanDuyne | B60L 53/12 |
| 2022/0363149 | A1 * | 11/2022 | Copeland | B60L 53/126 |
| 2023/0253859 | A1 * | 8/2023 | Grayson | H02K 7/1846 320/109 |

FOREIGN PATENT DOCUMENTS

WO WO-2021015252 A1 * 1/2021 ............... B60K 1/04

* cited by examiner

*Primary Examiner* — Joshua E Rodden

(57) ABSTRACT

An apparatus for transmission of electricity by conduction to a vehicle while in motion.

10 Claims, 8 Drawing Sheets

MOTION PLUG

FIELD OF THE INVENTION

The present invention is in the field of devices for powering electrical vehicles. More specifically, the present invention relates to transmission of electricity by conduction to a vehicle while in motion.

BACKGROUND OF THE INVENTION

Electrical Vehicles (EVs) are mostly powered by onboard battery packs that store the power needed for the operation of the vehicle. The range and duration of operation of a given EV is limited by the amount of energy that its battery pack is capable of storing, which is determined by the type and size of the battery used in that vehicle as well as the total weight of the EV.

Recent technological developments have significantly increased the energy storage capacity per unit weight of batteries. However, the size and weight of the battery pack remain a major obstacle to widespread adoption of EVs, particularly in freight. Currently, EVs must allocate a significant portion of their payload capacity to accommodating the battery pack and spend a significant portion of their onboard stored energy in transporting its heavy weight. Consequently, the range of most EVs is a factor that limits widespread adoption as it is generally less than gasoline-powered vehicles. The problem is particularly acute for large trucks that require significantly higher stored energy because of their much larger weight.

One solution to reduce the size and weight of the battery pack and extend the range of EVs is onboard generation using gasoline engine generator. This is not ideal because the EV resorts back to using gasoline after a certain travel distance.

Another potential solution is by electrical transmission by magnetic induction. Also known as inductive coupling, this is a theoretically sound process that can transmit electrical power to a vehicle while in motion, but it faces practical limitations including low efficiency and insufficient power.

The ultimate system would have the capability of direct connection of the EV to the power grid while in motion, similar to electrical trains that connect via the third rail, or electrical buses that connect via overhead power lines. However, these solutions are currently considered impractical for vehicles on roads.

Therefore, there remains a need for a means of connecting a moving EV to the power grid to supply its onboard needs. Such an apparatus would constitute a major development in vehicular transportation and would pave the way for the widespread adoption of EVs.

SUMMARY OF THE INVENTION

The present invention provides a solution for the above stated need by an apparatus that physically establishes electrical connections between EVs in motion and power transmission lines embedded in the road, to result in a complete circuit for power transmission by electrical conduction. The apparatus is comprised of at least one power supply and one power return line at road level accessible to EVs, plus means of connecting EVs in motion to said lines. As such, the power supply concept of the present invention is identical to what has been used for electrical trains and trams for decades. The apparatus constitutes a new electrical infrastructure and service on highways and main roads. It serves as an electrical outlet for EVs to connect to while in motion and eliminates the need for substantial power storage onboard. Onboard power storage will still be needed for areas not covered by the service, which would be for short distances near highways and main roads equipped with the service, and hence comparatively small.

The power supply line of the present invention is longitudinally embedded along the interior of a travelling lane on the inside, in an insulated environment just below surface. It is separated by air gaps from sequentially disposed individual breakers above, with conductor outcrops on the road surface. The breakers are embedded in an elastic compressible material of certain stress-strain characteristics that compresses to close the air gaps and make contact with the power supply line when, and only when, a vehicle tire having a certain weight, tire pressure, and contact area passes directly over said contactors; and elastically rebounds to open the air gaps once the vehicle tire moves passed. This results in individual breakers sequentially closing and thus establishing contact with the power supply line, making power available at road surface. The power may then be transmitted to the EV passing directly over via a conductive tire as described herein.

Breakers may cover a certain width of the road that is wider than the vehicle tire to provide position flexibility within the travelling lane for the EVs, or safety consideration may require the breakers to cover a width that is narrower that vehicle tires, to be fully covered by the footprint of the tire when contact with the supply line is made, thus preventing any exposure of live electricity. The latter would practically fix the position of EVs within the travelling lane for power supply, which may be maintained with the aid of emerging "driver-assist", "auto-pilot", and "self-driving" technologies that accurately position a vehicle within a lane while in motion using satellite position data.

The return line of the present invention is a strip of conductor material embedded in the road, along the interior of a travelling lane on the inside, opposite and parallel to the power supply line, with top side exposed. It is disposed to connect with a conductive EV tire on that side, and is connected to a ground source to maintain its potential at or near zero volts, rendering it safe for exposure and direct contact. The widths and positions of the supply and return lines within the travelling lane are design variables to provide coverage for contact with the corresponding tires of different type and size EVs over the prevailing range of vehicle track widths.

The present invention includes especially configured electrically conductive tires that connect with the above-described power supply and return lines. Currently, conductive tires are used to avoid static electricity buildup, particularly in airplanes that experience high friction during landing, which can build significant static charge. There are a number of ways to incorporate conductive properties in tires that include impregnation of the rubber with various conductive material, or use of specially formulated conductive elastomers. The present invention may use fully conductive tires made entirely of electrically conductive material, or specially configured tires made from segments of conductive material with insulating material in between. The latter is superior from a safety standpoint as only the segments in direct contact with the live conductor outcrops on the road surface will be live, with the rest of the tire remaining neutral.

The present invention also includes a stationary contact between the live tire, or live segments on the tire, and the EV. The configuration of the contact is similar in operation principal to stators used in electrical generators and motors.

While connected, the electricity continuously charges a smaller onboard battery pack that powers the EV. The battery pack is sized to store sufficient energy for durations when the EV is on roads that are not equipped with the service as well as to provide the specified peak power to the EV at all times.

It is an object of this invention to provide a simple and practical method of externally powering electrical vehicles by electrical conduction from a stationary source while in motion.

It is an object of this invention to provide improved elements and arrangements by apparatus for the purposes described thereof, which is comparable in cost with existing systems, dependable, and fully effective in accomplishing its intended purposes.

These and other objects of the present invention will become readily apparent upon further review of the following specification and drawings.

DETAILED DESCRIPTION

Figure 1:
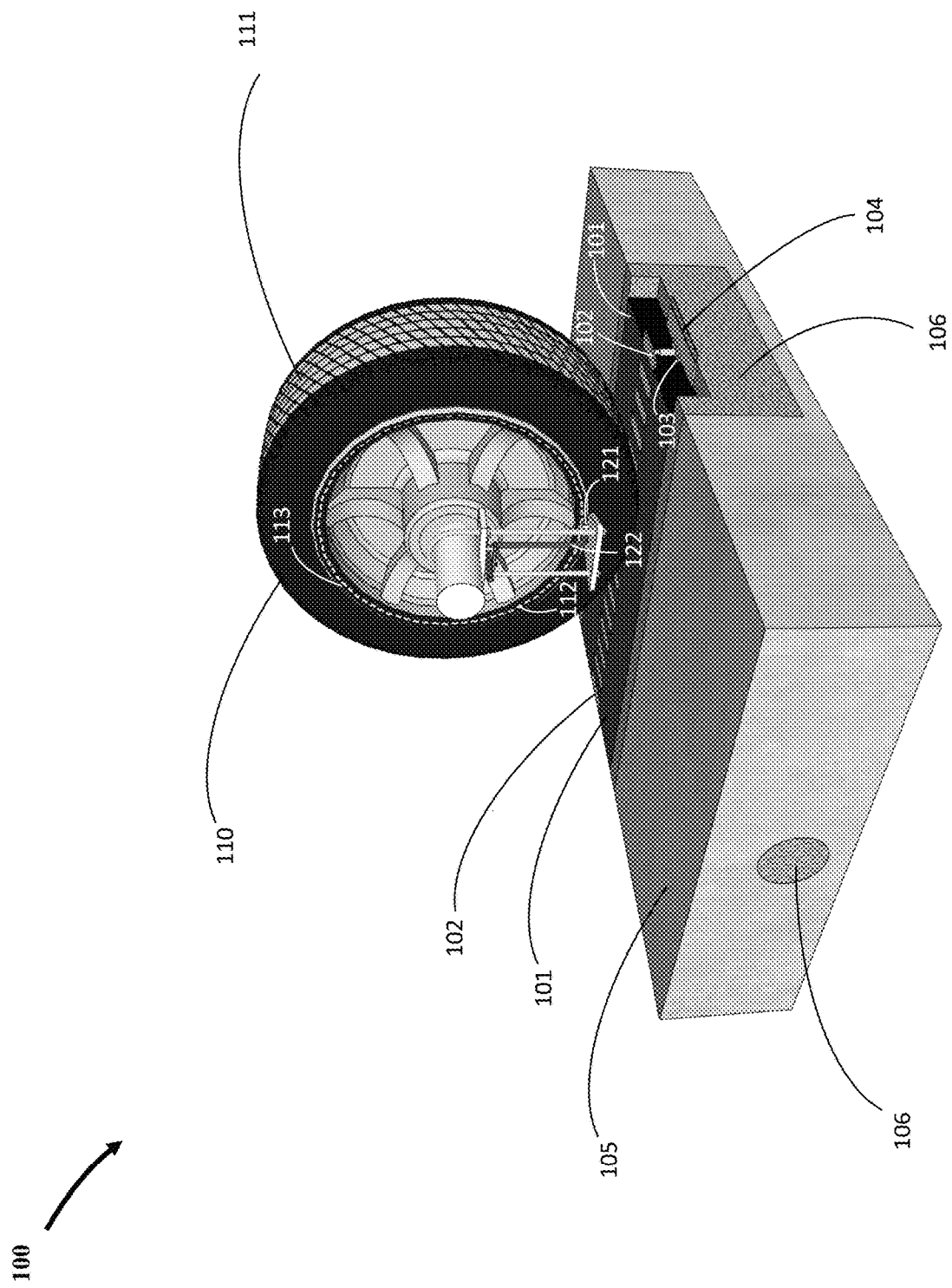
FIG. 1 is a perspective view showing the various components of the present invention.

Referring to FIG. 1, there is shown a perspective view of one embodiment of the present invention 100. The invention is comprised of compressible elastomer 101 embedded in roadway 105 atop live electrical conductor 104 and housed in permeable material 106 for drainage and conveyance of water. Elastomer 101 is fitted with sequentially arranged breakers 103 with conductor strips 102 on surface of road 105 disposed above and normally separated from live electrical conductor 104. Elastomer 101 is compressed by EV tire 110 fitted with conductor segments 111, closing contact between breaker 103 and live conductor 104 below making corresponding conductor strips 102 electrically live. Conductor segments 111 are internally connected to conductor outcrops 112 configured around wheel rim 113. Electrical wire 122 is connected to stator 121, which is in continuous contact with conductor outcrops 112 and completes the transmission line between live conductor 104 embedded in roadway 105 and the EV (not shown) in motion to which tire 110 belongs.

Figure 2:
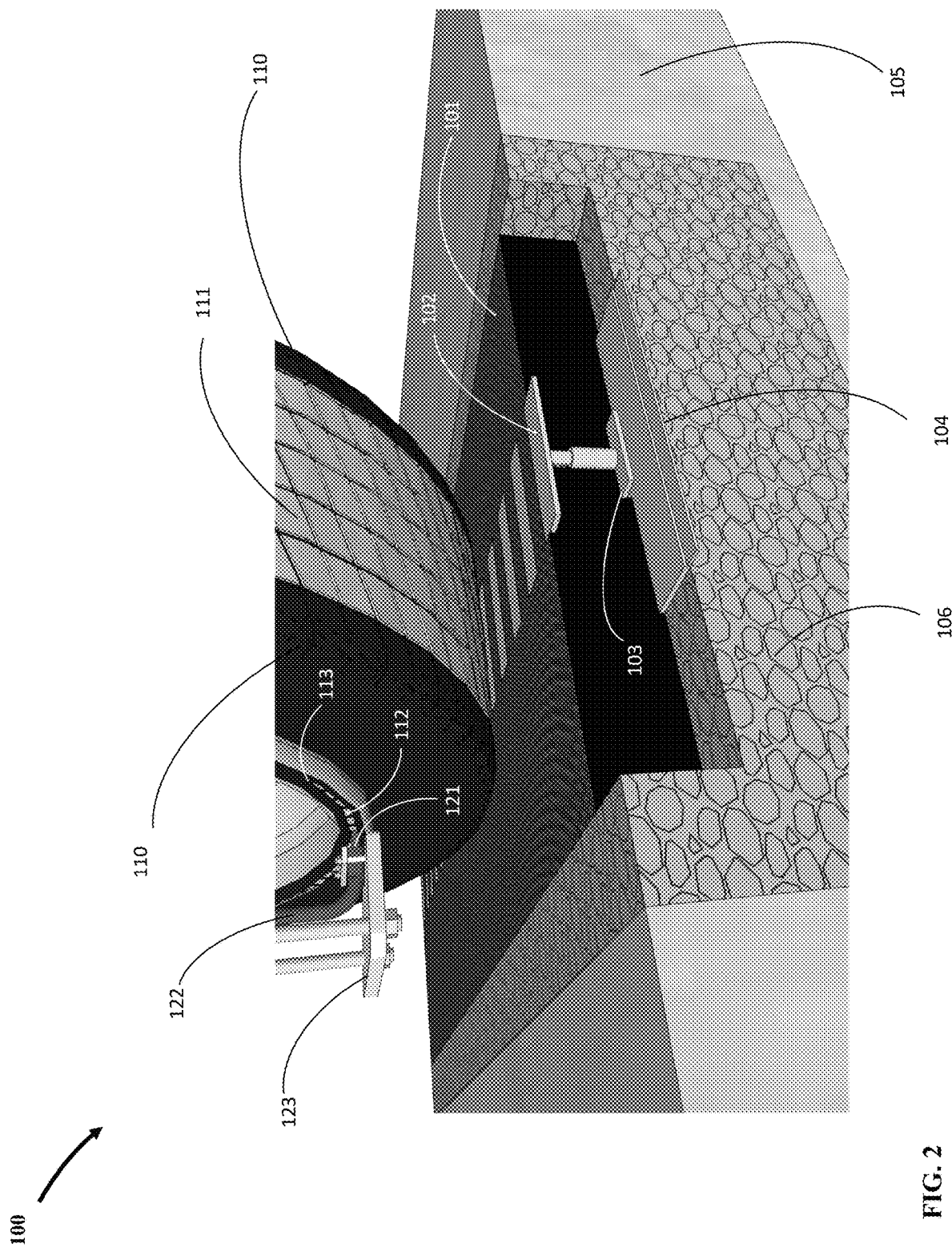
FIG. 2 is a closeup perspective view showing the various electrical conductors, elastomer housing, contactors, power transmission, and drainage system, which comprise the present invention.

FIG. 2 is a closeup perspective view of the present invention 100 showing compressible elastomer 101 embedded in roadway 105 and housed in permeable material 106 for drainage. Elastomer 101 is fitted with sequentially arranged breakers 103 with conductor strips 102 on surface of road 105 disposed above and normally separated from live electrical conductor 104. Elastomer 101 is compressed by EV tire 110 fitted with conductor segments 111, closing contact between breaker 103 and live conductor 104 below making corresponding conductor strips 102 electrically live. Conductor segments 111 are internally connected to conductor outcrops 112 configured around wheel rim 113. Electrical wire 122 is connected to stator 121, which is in continuous contact with conductor outcrops 112 and completes the transmission line between live conductor 104 embedded in roadway 105 and the EV (not shown) in motion to which tire 110 belongs, via closed breaker 103 and corresponding conductor strip 102.

Figure 3:
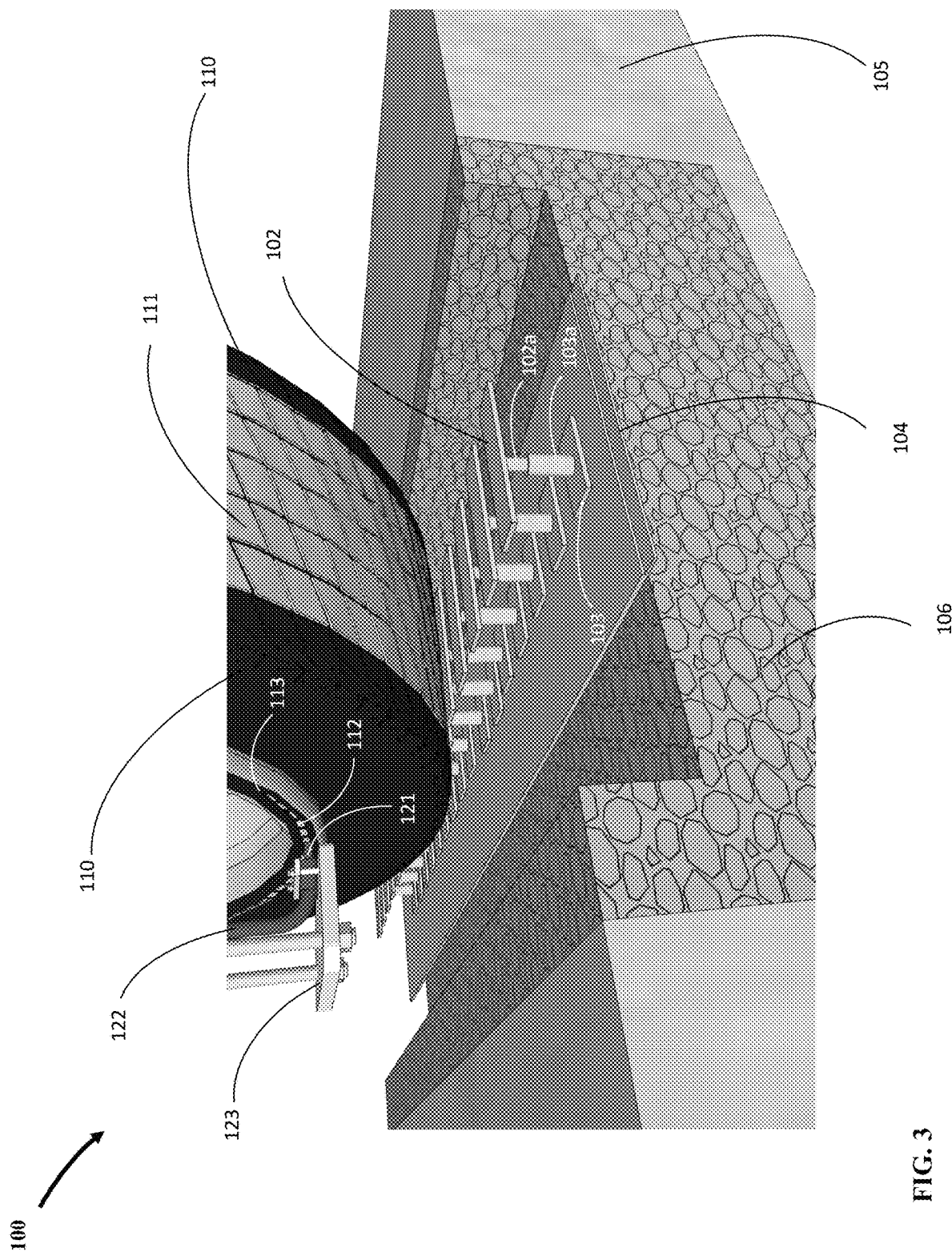
FIG. 3 is the perspective view of FIG. 2 with the elastomer, which houses the contactors, hidden to show the contact mechanism.

FIG. 3 is the perspective view of FIG. 2 with elastomer 101 hidden to show the breaker mechanism. Conductor strip 102 has a male stem 102a that inserts inside a female stem 103a connected to breaker 103. The arrangement permits conductor strip 102 to be pressed further down unhindered even after breaker 103 is fully closed. This maintains the compressive property of elastomer 101, fitted with breaker 103 and conductor strip 102, the same.

Figure 4:
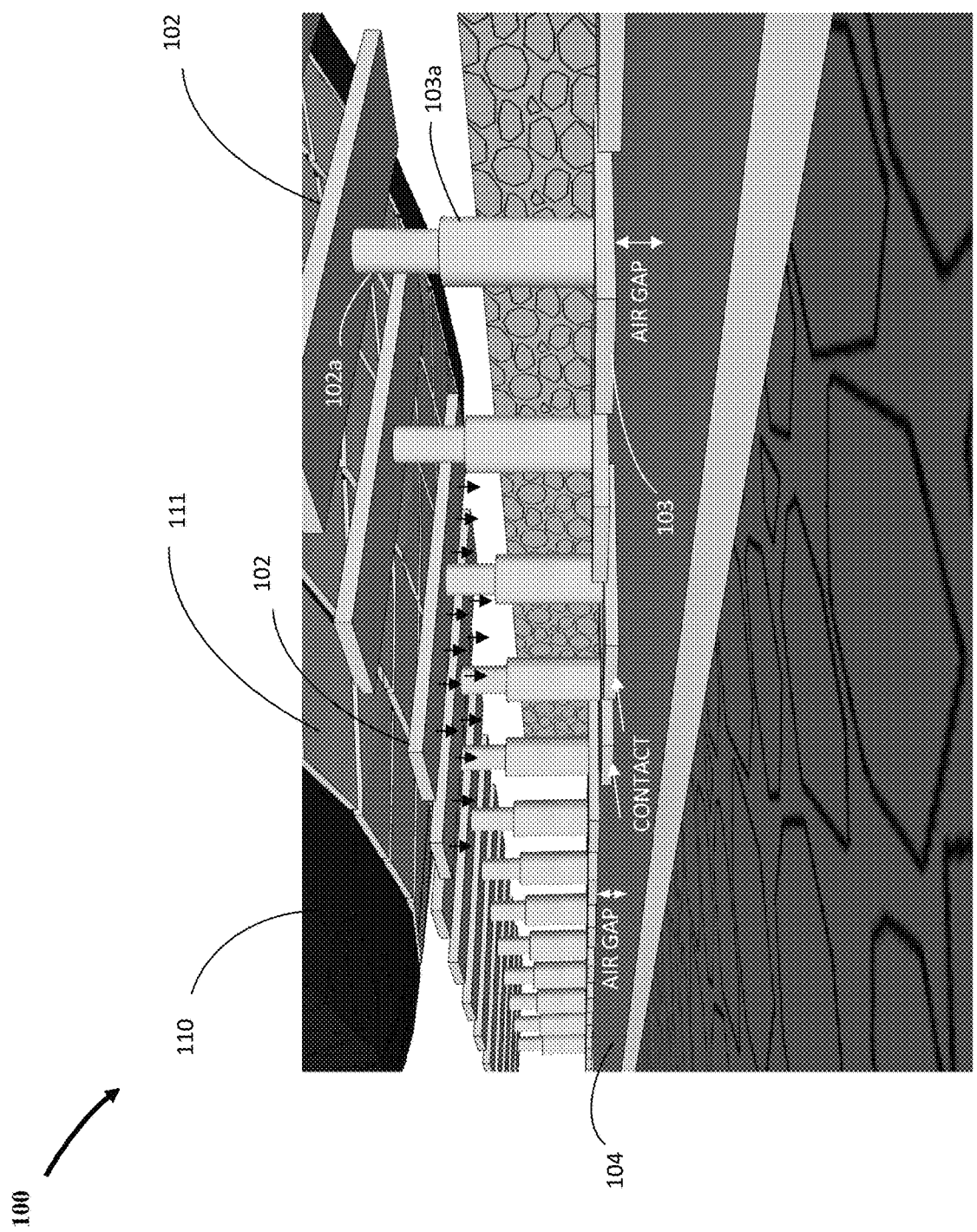
FIG. 4 is a closeup perspective view of FIG. 3 further zooming on the breakers and the contact mechanism.

FIG. 4 is a closeup perspective view of contact mechanism between conductive segments 111 on EV tire 110 and live conductor 104. At least one breaker 103 directly under tire 110 is pressed down by the force of tire 110, shown as vertical arrows pointing down, resulting in the closure of air gap between breaker 103 and live conductor 104. Weight of tire 110 is resisted by compressive strength of elastomer 101 (not shown) that houses breakers 103. Strain resulting from pressure of tire 101 over contact area between tire 110 and elastomer 101 (not shown) is in excess of air gap between breaker 103 and live conductor 104 resulting in compete closure of air gap and firm contact between breaker 103 and live conductor 104. Any additional strain in excess of air gap between breaker 103 and live conductor 104 inserts male stem 102a into female stem 103a.

Figure 5:
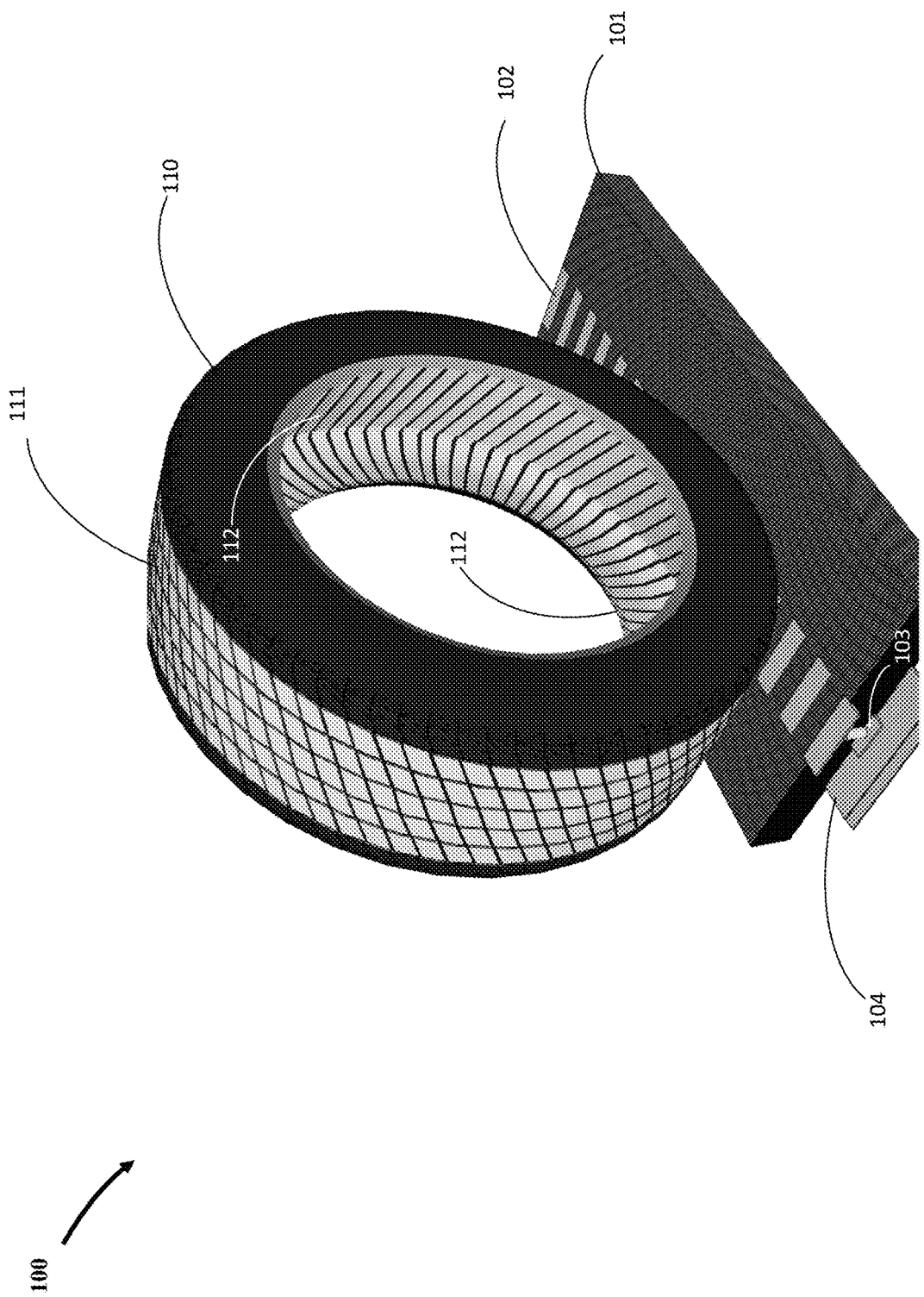
FIG. 5 is a perspective view of one configuration of the tire of the present invention showing an arrangement for electrical communication between external conductive segments and internal conductor strips.

FIG. 5 shows both exterior and interior of EV tire 110 revealing how exterior conductor segments 111 may be connected together by internal conductor bands 112 for power transmission to the rim of tire 110 for pick up. Each internal conductor band 112 connects to a plurality of conductor segments 111 arranged in slanted rows, and terminates as an outcrop on rim 113 of tire 110. Any conductor segment 111 in contact with a live conductor strip 102 will result in the conductor band 112 to which it is connected to become live. All other conductor bands 112 will remain without electrical power.

Figure 6:
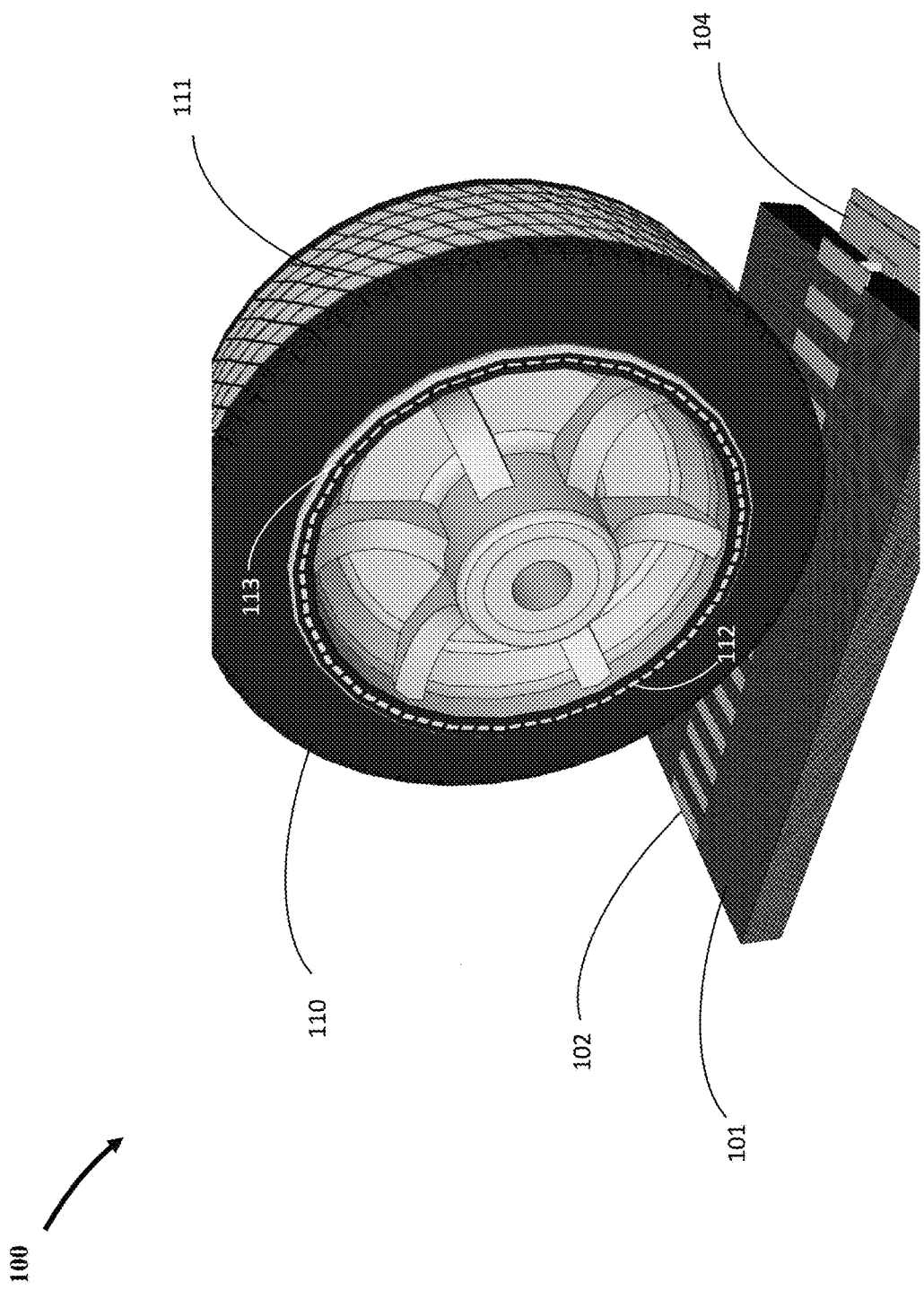
FIG. 6 is a perspective view of the inside face of the tire of the present invention showing one arrangement for configuring the internal conductor strips on the tire rim for power pick up and transmission to the EV.

FIG. 6 shows terminal points (outcrops) of internal conductor bands 112 exposed along rim 113 of tire 110. Conductor segments 111 on the low point of tire 110 are in contact live conductor strip 102 resulting in the corresponding conductor band outcrops 112, which is located on the low point of rim 113 of tire 110, to become live. Therefore, at least one conductor band outcrop 112 on the low point of rim 113 of tire 110 is always live and this location is the point where electrical power from live conductor 104 is continuously available to the EV (not shown) in motion to which tire 110 belongs.

Figure 7:
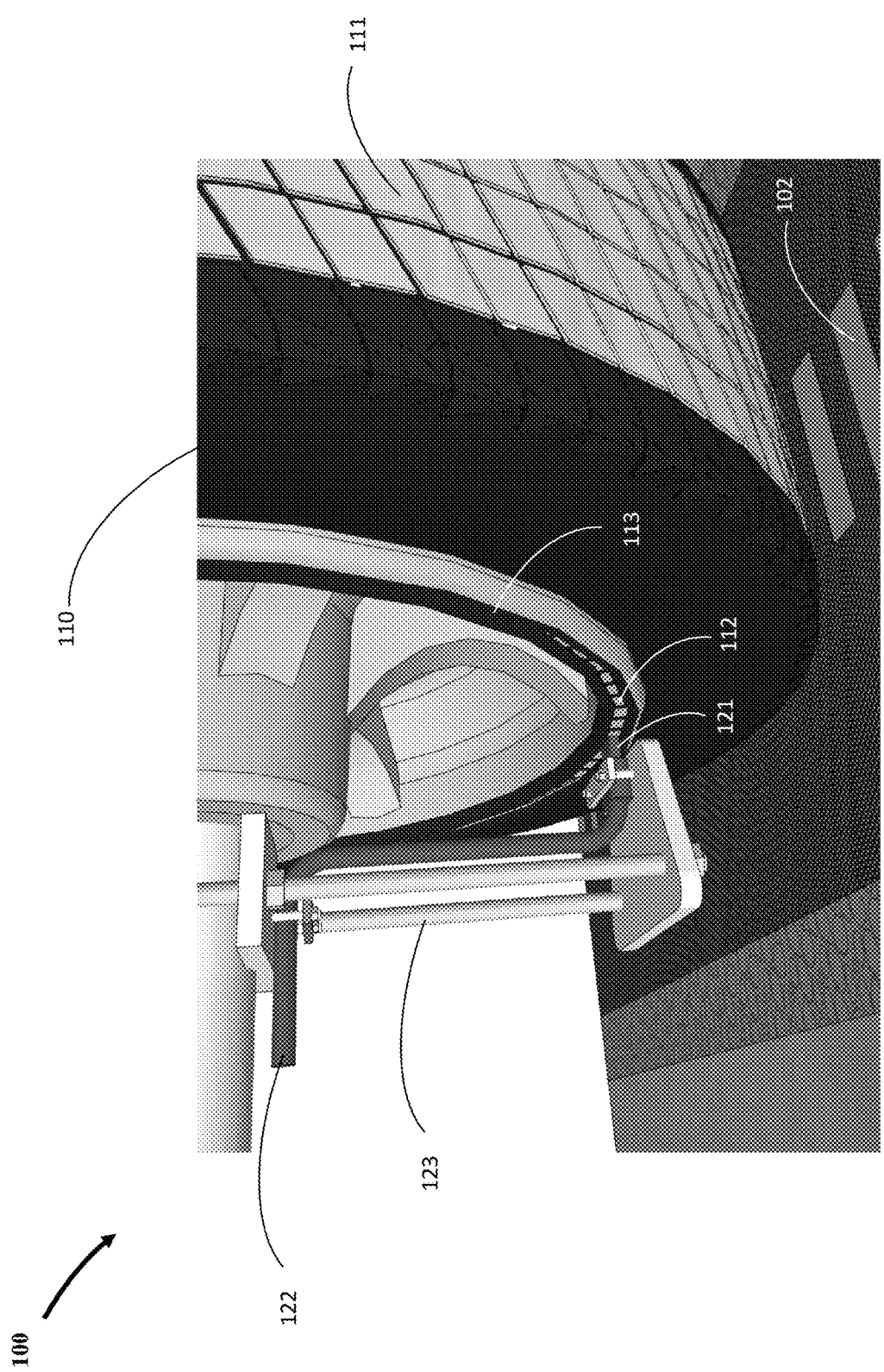
FIG. 7 is a perspective view of the inside face of the tire of the present invention showing one arrangement for electrical communication between tire rim and the EV.

FIG. 7 shows mechanism for transmitting power from live conductor band outcrops 112, located at lowest point of rim 113. Stator 121 mounted on fixed bracket 123 is in direct physical contact with live conductor strip outcrops 112 at low point of rim 113, and is connected to electrical wire 122 that conducts electrical current from live conductor strip outcrops 112.

Figure 8:
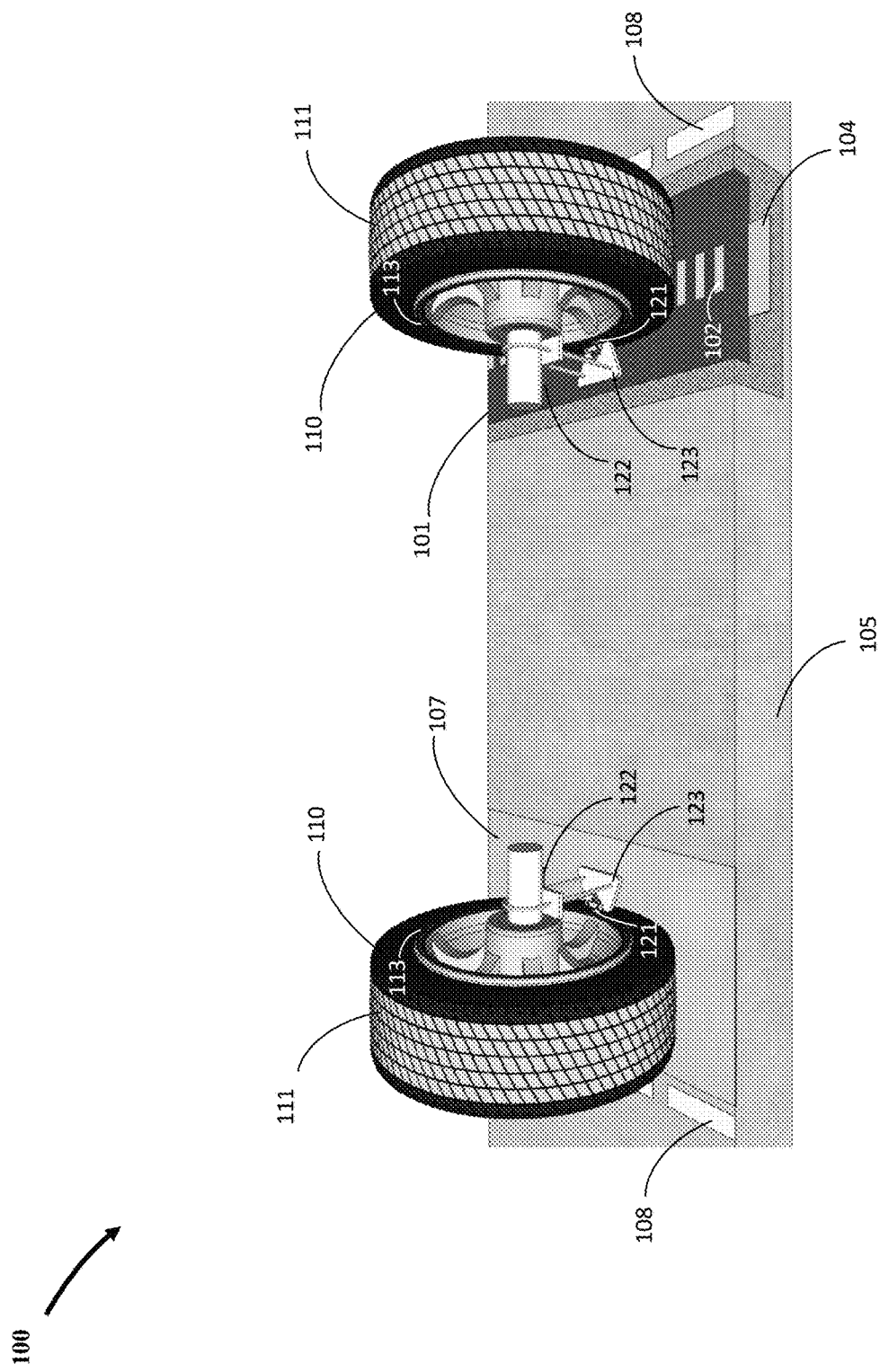
FIG. 8 is a perspective view of the inside faces of the opposing tires of the present invention on an EV showing one arrangement for connecting the EV to the return line to complete the electrical circuit.

FIG. 8 is a perspective view of the inside faces of the opposing EV tires 110 of present invention 100, disposed inside lane defined by road markings 108. Neutral conductor 107 is embedded in surface of road 105 to complete the electrical circuit with live conductor 104. Neutral conductor 107 serves as the low potential for electrical power picked up by breaker 103 embedded in elastomer 101, and transmitted via conductor strip 102 to conductor segments 111 and conductor bands 112 (not shown) inside each tire 110 outcropping around tire rim 113 to stators 121 connected to electrical wire 122 held in place by brackets 123. The width of neural conductor 107 may be substantially wider that the width of any given EV tire and cover a substantial width of the roadway to accommodate the range of prevailing EV track widths.

The present invention is susceptible to modifications and variations which may be introduced thereto without departing from the inventive concepts and the object of the invention. These may include other means and mechanisms of establishing electrical conduction between an EV and live and neutral conductors embedded in the road. For example, various types of switches triggered by signals and mechanisms other than weight of the EV or pressure of the EV tires may be used to make live either the main conductors, breakers, or both. These may include but are not limited to remote communication via electromagnetic wave transmission, use of light and laser rays, and electromagnetic induction. Additionally, transmission between the live and neutral conductors in the road may be by means and mechanisms other that via the vehicle tires. These may include but are not limited to at least one additional wheel on the vehicle positioned at any suitable location between the road surface and the vehicle for power pick up and return, and non-rotating, sliding electrical contact extending down from the vehicle to road surface to establish contact and thus enable electrical conduction. These variations remain within the main object of the present invention, which is to power electrical vehicles while in motion by electrical conduction from a stationary source.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. An apparatus for transmission of electricity by conduction to at least one vehicle while in motion, apparatus comprising:
a live electrical conductor embedded within and along a paved road and isolated from water, said live electrical conductor disposed to supply electrical power to said at least one electrical vehicle travelling on said road while said vehicle is in motion, said electrical conductor overlain with a plurality of electrical breakers disposed to establish electrical contact between said live electrical conductor and corresponding strips of conductor material on a surface of said road, said strips disposed to conduct electricity to said electrical vehicle by physical contact, said electrical breakers normally open and only closed to make said strips electrically live once said electrical vehicle is in physical contact with said strips such that electrical conduction may occur;
a neutral electrical conductor installed on said surface of said road running parallel to said live electrical conductor disposed to make physical contact with said electrical vehicle and thereby complete an electrical circuit between said live electrical conductor and said electrical vehicle;
at least two electrically conductive tires for being attached to said electrical vehicle; one tire of said at least two electrically conductive tires disposed to connect to said live electrical conductor via physical contact with said strips, and another one of said at least two electrically conductive tires disposed to connect to said neutral conductor by direct physical contact, while said electrical vehicle is in motion, said tires each fitted with stator devices disposed to conduct electricity by physical contact to and from said electrical vehicle.

2. The apparatus of claim 1, wherein a portion of said surface of said road with said strips is made from an elastomer.

3. The apparatus of claim 1, wherein said live electrical conductor is housed in permeable material for drainage and conveyance of water.

4. The apparatus of claim 1, wherein each of said breakers includes a female stem which receives a male stem of a corresponding one of the strips.

5. The apparatus of claim 1, wherein an air gap is formed between each of the breakers and the live electrical conductor.

6. The apparatus of claim 5, wherein the air gap between each of the breakers and the live electrical conductor is closed when said one tire of said at least two electrically conductive tires makes contact with a respective one of the strips.

7. The apparatus of claim 1, wherein said at least two electrically conductive tires each include conductive segments.

8. The apparatus of claim 7, wherein the conductive segments are configured to conduct electricity received from respective ones of the strips to the stator devices disposed to conduct electricity by physical contact to and from said electrical vehicle.

9. The apparatus of claim 7, wherein the conductive segments are connected together by internal conductor bands for power transmission to a rim of each of the respective tires.

10. The apparatus of claim 9, wherein terminal points of said internal conductor bands are exposed along the rim of each respective one of the tires, the terminal points of said internal conductor bands for transmitting power to the respective stator devices.

* * * * *